(12) United States Patent
Kauffman et al.

(10) Patent No.: US 9,451,339 B2
(45) Date of Patent: Sep. 20, 2016

(54) SENSOR COMMUNICATION SYSTEM FOR METAL ENCLOSURES

(71) Applicant: University of Dayton, Dayton, OH (US)

(72) Inventors: Robert E. Kauffman, Centerville, OH (US); J. Douglas Wolf, Kettering, OH (US)

(73) Assignee: University of Dayton, Dayton, OH (US)

( * ) Notice: Subject to any disclaimer, the term of this patent is extended or adjusted under 35 U.S.C. 154(b) by 185 days.

(21) Appl. No.: 14/162,845

(22) Filed: Jan. 24, 2014

(65) Prior Publication Data

US 2015/0215684 A1    Jul. 30, 2015

(51) Int. Cl.
*G08B 21/00*  (2006.01)
*H04Q 9/00*  (2006.01)
*G06K 19/07*  (2006.01)

(52) U.S. Cl.
CPC ............ *H04Q 9/00* (2013.01); *G06K 19/0716* (2013.01); *G06K 19/0717* (2013.01); *G06K 19/0723* (2013.01); *H04Q 2209/40* (2013.01); *H04Q 2209/886* (2013.01)

(58) Field of Classification Search
CPC .................................. G08C 17/02; H04Q 9/00
See application file for complete search history.

(56) References Cited

U.S. PATENT DOCUMENTS

| | | | | |
|---|---|---|---|---|
| 3,806,905 A | * | 4/1974 | Strenglein | B60C 23/0408 307/112 |
| 3,961,323 A | * | 6/1976 | Hartkorn | G08B 13/22 340/429 |
| 5,682,149 A | * | 10/1997 | Hofman | A61B 5/0008 340/870.17 |
| 5,729,199 A | * | 3/1998 | Cooper | B60R 25/1025 340/426.17 |
| 7,154,390 B2 | * | 12/2006 | Giermanski | G07C 5/0858 340/539.22 |
| 7,224,273 B2 | * | 5/2007 | Forster | B65D 7/045 340/539.1 |
| 7,832,281 B2 | * | 11/2010 | Mian | G07C 3/00 340/870.18 |
| 2003/0214399 A1 | * | 11/2003 | Naruse | G01K 1/026 340/531 |
| 2004/0113790 A1 | * | 6/2004 | Hamel | G06K 19/0723 340/572.1 |
| 2007/0159161 A1 | * | 7/2007 | Neill | F15B 15/28 340/539.22 |

\* cited by examiner

*Primary Examiner* — Mark Rushing
(74) *Attorney, Agent, or Firm* — Dinsmore & Shohl LLP

(57) ABSTRACT

A sensor transmitter for communicating wirelessly a presence of a condition within a metal enclosure includes a power supply, at least one sensor where each sensor senses a presence of a condition, and a low frequency generator positioned within a metal enclosure and electrically coupled to the power supply and the at least one sensor. The low frequency generator transmits a low frequency wireless signal indicative of the presence of the condition within the metal enclosure when the condition is present at one sensor.

16 Claims, 4 Drawing Sheets

SENSOR COMMUNICATION SYSTEM FOR METAL ENCLOSURES

STATEMENT REGARDING FEDERALLY SPONSORED RESEARCH OR DEVELOPMENT

This invention was made with government support under FA8650-11-D-5610, TO1 awarded by Air Force Research Labs, Materials Integrity Branch (AFRL/RXSA). The government has certain rights in the invention.

BACKGROUND

Sensors are placed in a variety of locations to sense or detect a variety of conditions or events. For example, fuel leak sensor may be placed on the outside wall or containment walls of an aircraft fuel tank to detect a leak. Sensor may be placed within shipping containers to detect tilt, corrosive species, wall cracks, light, temperature or impact. Sensors are required to be hardwired because wireless transmissions of signals from an internal point to an external receiver are severely attenuated, or weakened in force or intensity, as the signals pass through the metal enclosures. The attenuation of the wireless signal makes wireless communication with a sensor within a metal tank difficult. Radio Frequency Identification (RFID) systems and other wireless devices inside a metal enclosure are found to be unable to communicate with an outside antenna or reader without a direct wired connection. Furthermore, the penetration of a wire in a sealed tank may be problematic if the tank is designed to maintain a pressure or remain completely filled with a liquid.

Accordingly, a need exists to communicate with sensors within metal enclosures without a wire penetration in the metal enclosure.

SUMMARY

In one embodiment, a sensor transmitter for communicating wirelessly a condition within a metal enclosure includes a power supply, at least one sensor where each sensor senses a presence of a condition, and a low frequency generator positioned within a metal enclosure and electrically coupled to the power supply and the at least one sensor. The low frequency generator transmits a low frequency wireless signal indicative of the presence of the condition within the metal enclosure when the condition is present at the individual ones of the at least one sensor.

In another embodiment, a method for communicating a presence of a condition within a metal enclosure includes sensing a condition internal to a metal enclosure using at least one sensor and transmitting a low frequency wireless signal using a low frequency generator electrically coupled to a power supply and the at least one sensor when the condition is present at the at least one sensor.

In yet another embodiment, a system for communicating with a sensor within a metal enclosure includes a first power supply, one or more sensor transmitters internal to a metal enclosure, and a receiver. A first sensor transmitter includes a first sensor to detect a presence of a first condition, a first low frequency generator electrically coupled to the first power supply and the first sensor and transmits a first low frequency wireless signal when the first condition is present at the first sensor, and a first comparison device electrically coupled between the first sensor and the first low frequency generator. The receiver is external to the metal enclosure that receives the first low frequency wireless signal indicative of the detection of the presence of the first condition.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
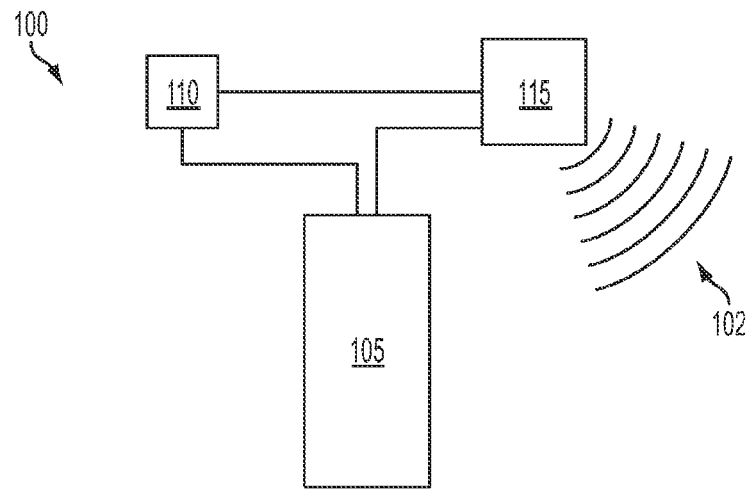
FIG. 1 depicts a sensor transmitter according to one or more embodiments shown and described herein.
Figure 4:
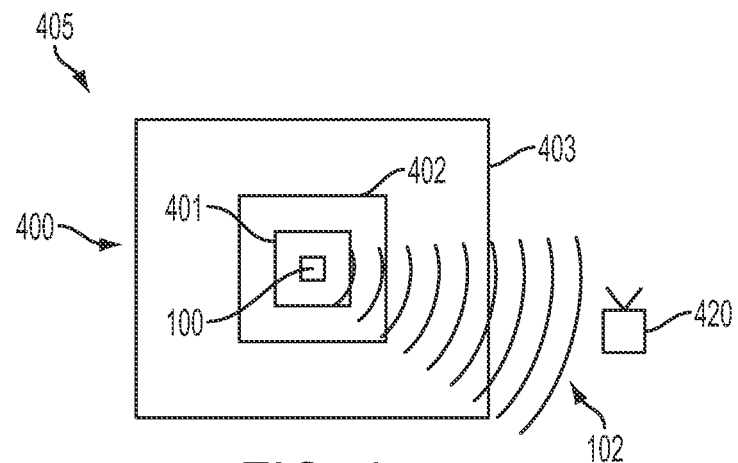
FIG. 4 depicts a sensor communication system according to one or more embodiments shown and described herein.

FIGS. 1 and 4 generally depict a sensor transmitter 100 according to one or more embodiments shown and described herein. The sensor transmitter 100 may reside within, or internal to, one or more metal enclosures 400 (FIG. 4) and senses or detects a condition or monitors for the occurrence of an event. When the condition is present or event occurs, the sensor transmitter 100 transmits, or emits, a signal 102 indicating the occurrence of a monitored event or a sensed condition. The signal 102 vibrates or propagates through the walls of the one or more metal enclosures 400 to a receiver external 420 (FIG. 4) to the one or more metal enclosures 400. The sensor transmitter 100 may be mounted anywhere within the one or more metal enclosures 400. The one or more metal enclosures 400 may include nested metal enclosures. A nested metal enclosure is defined as a sequence of placing a smaller metal enclosure within a larger metal enclosure, the larger metal enclosure within an even larger metal enclosure, and so on. The signal 102 may be required to propagate through one or more walls of the nested metal enclosure to reach the receiver 420. The signal 102 in one embodiment may be a low frequency wireless signal and have an electrical field component and a magnetic field component. The receiver 420 may be configured to receive wirelessly either the electrical field component of the low frequency wireless signal or the magnetic component of the low frequency wireless signal.

Referring to FIG. 1, the sensor transmitter 100 includes a power supply 105, a sensor 110, and a low frequency generator 115. The power supply 105 provides the electromotive force for the sensor transmitter 100. The power supply 105 may be, but not limited to, an electro-chemical cell, a DC power supply, an A/C power supply, an induction antenna, or the power supply may use energy harvesting techniques where the energy could be thermal, mechanical, etc. Energy harvesting may be defined as the process to convert thermal and/or mechanical energy into electrical energy. Specifically, energy harvesting may be a device that converts vibration (cantilever or piezoelectric), temperature (thermoelectric material), and other forms of energy into electricity that is used to charge a battery or capacitor to supply power to the sensor transmitter 100. For example, motion energy may be used to produce energy for the sensor transmitter 100 such as the energy conversion process that is found in kinetic watches. In one embodiment, the electrochemical cell may be a 5 volt direct current (VDC) battery, a 9VDC battery, a 12 VDC battery, or a 24 VDC battery. In another embodiment, the power supply is an induction antenna that is configured to power the sensor transmitter 100 when the induction antenna is within an excitation field. An external transmitter may be used to create the excitation field. The excitation field is electromagnetic radiation with a specific frequency. The specific frequency is chosen to coordinate with the configuration of the induction antenna to induce a current within the induction antenna and power the sensor transmitter 100. The specific frequency is also chosen to propagate through metal with minimal attenuation. The sensor transmitter 100 may only be powered while the induction antenna is within the excitation field. In further embodiments, the induction antenna may include an energy storage device configured to extend a time period that the sensor transmitter 100 is powered after the excitation field is removed from the induction antenna. For example, the energy storage device may be a capacitor that is charged while the induction antenna is within the excitation field and is discharged to power the sensor transmitter 100 when the induction antenna is not within the excitation field.

The sensor 110 may be used to detect or sense the presence of a condition or the occurrence of an event. In one embodiment, the sensor 110 may act as a crude ON/OFF switch that goes through a permanent change for applications where the sensor transmitter 100 is checked periodically or at set intervals. In another embodiment, the sensor 110 may undergo a momentary change for applications where a sensor transmitter 100 is monitored continuously. The sensor 110 may change an electrical characteristic (i.e. capacitance, inductance, or resistance) in response to sensing a sensed condition or event. The sensor 110 may be, but is not limited to, a leak detection sensor, a vapor sensor such as a corrosive vapor sensor for example, a water sensor, an organic liquid sensor, an impact sensor, a temperature sensor, a liquid level sensor, a tilt sensor, a distillate sensor, a vibration sensor, an acoustic sensor, a light sensor, push button switch, conductive line, and a corrodible metal film sensor. An example of the impact sensor may be an IOG products OMNI-G sensor, 2G sensor, or their 100G sensor. An example of the temperature sensor may be an Amico thermal fuse, 250V, 10 A, cutoff 121° C., model # X000GP9DA3. Conductive line could be drawn using a two part silver epoxy ink such as 118-09A/119-44 produced by creative Materials. The push button switch may be a miniature push button switch such as a Mini Push Button Switch, part number SMD COM-08720. The type of sensor 110 is chosen to match the condition or event required to be present or detected by the sensor 110. For example, the condition or event within the metal enclosure may be a leak, an impact, corrosive vapor, humidity, fuel, vapor, temperature, levelness, flexing of components within the metal enclosure, vibration, sound, surface crack, clamp opening, or light. In another example, if the sensor 110 is to detect a fuel leak within a metal fuel tank, the sensor 110 may be an electrochemical detector, an infrared point detector, an infrared imaging detector, a semiconductor detector that reacts with the fuel, an ultrasonic detector, and/or a holographic detector. The sensor 110 may react to the presence of the condition by electrically becoming a closed circuit by closing a switch, a relay contact, a set of contacts, or become conductive. Alternatively, the sensor 110 may react to the presence of the condition by electrically becoming an open circuit by opening the switch, the relay contact, the set of contacts, or become non-conductive. The sensor 110 is electrically coupled to the low frequency generator 115 and in the presence of the condition or event, the sensor provides an electrical path to energize or activate the low frequency generator 115.

An example of the fuel leak sensor may be a 3 inch long (0.1 inch diameter/thickness), silver filled silicone rubber cord or sheet that swells in the presence of fuel. The swelling separates the silver particles and the resistance of the cord increases from below 10 ohms ($\Omega$) to over 1 M$\Omega$. A change in resistance is detected and indicates that fuel is present in the fuel leak sensor.

The low frequency generator 115 may be electrically coupled to the power supply 105 and the sensor 110. In one embodiment, the low frequency generator 115 wirelessly transmits a low frequency wireless signal 102 when the condition is present. The low frequency wireless signal 102 may be basically a signal that is able to penetrate the metal enclosure to allow for the indication that the sensor 110 detects the presence of the condition or event. The low frequency generator 115 may be an acoustic device such as a bell, a buzzer, a piezo buzzer, a transducer, resonance coil, or it may be a mechanical device such as a motor, or a motor with an unbalanced weight (e.g. off-center weight mounted to the shaft of the motor) to produce a vibration. Examples of the low frequency generator 115 may include: a Radio Shack 6Vdc buzzer with a 300-500 Hz resonant frequency (273-0054); a Radio Shack 9Vdc piezo pulse buzzer with a 2800 Hz, model number 273-066; a Radio Shack 3Vdc-microvibration motor with a 16,000 RPM, model number 273-0107; and a Radio Shack 9Vdc Micro super high-speed motor with a 24,000 RPM, model number 273-0047.

Figure 2:
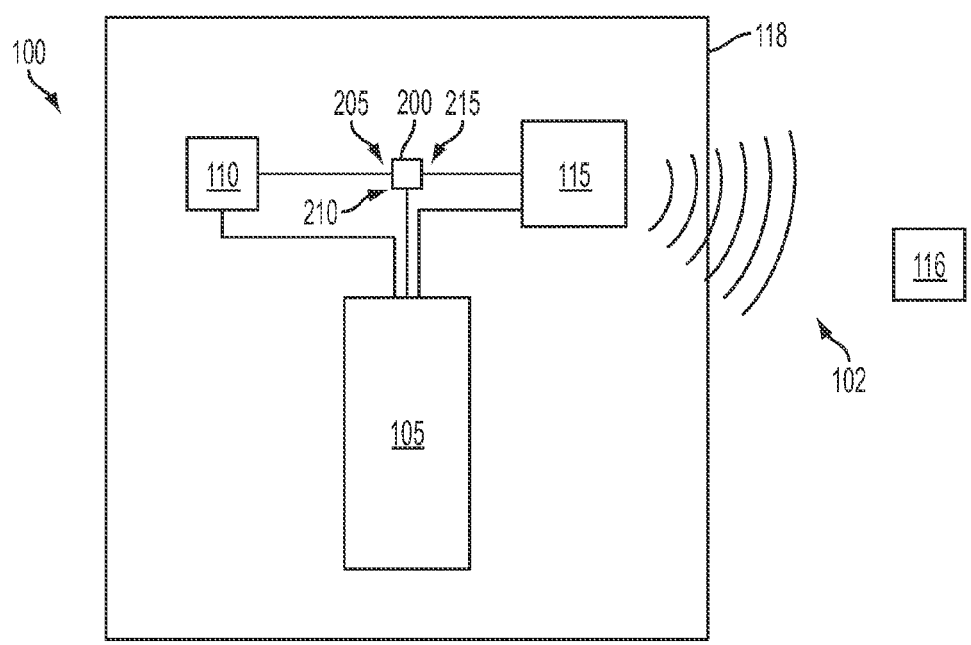
FIG. 2 depicts the sensor transmitter with the addition of a comparison device according to one or more embodiments shown and described herein.

FIG. 2 depicts the sensor transmitter 100 with the addition of a comparison device 200 electrically coupled to the sensor 110, the power supply 105, and the low frequency generator 115. The comparison device 200 has a first device input 205, a second device input 210, and a device output 215. The sensor 110 may be electrically coupled to the first device input 205 of the comparison device 200 and have a sensor voltage. The power supply 105 may be electrically coupled to the second device input 210 of the comparison device 200 and have a power supply voltage. The low frequency generator 115 may be electrically coupled to the device output 215 of the comparison device 200. A comparison voltage from the device output 215 may be used to energize or activate the low frequency generator 115.

The comparison device 200 may be used to monitor the sensor 110 and energize the low frequency generator 115 when the sensor 110 indicates it has detected or sensed the presence of the condition. The comparison device 200 may compare either the sensor voltage to the power supply voltage or a sensor current to a power supply current, and may output a digital signal (e.g. the comparison voltage) indicating which of the two voltages or currents is larger. The digital signal is a waveform that switches between two voltage levels at the device output 215. An ON voltage level equates to when the comparison voltage energizes the low frequency generator 115. An OFF voltage equates to when the comparison voltage does not energize the low frequency generator 115. For example, the comparison voltage may be about the power supply voltage when at the ON voltage and about zero volts when at the OFF voltage.

The comparison device 200 may be a field effect transistor (FET), an op-amp comparator such as a Schmidt trigger for example, or a dedicated voltage comparator chip such as a LM339 for example. If the sensor 110 does not detect or sense the presence of the condition or occurrence of the event, the sensor voltage may be about equal to the power supply voltage. The comparison device 200 may be configured to not output the comparison voltage from the device output 215 when the sensor voltage is about equal to the power supply voltage. If the sensor 110 does detect or sense the presence of the condition, the sensor voltage may not be about equal to the power supply voltage and the comparison device 200 may output the comparison voltage and energize or activate the low frequency generator 115. This example illustrates the sensor 110 with a set of normally closed contacts (i.e. the closed circuit condition) in the absence of the condition or event and an open-circuit condition when the condition is detected or event has occurred. The open-circuit condition will change the sensor voltage from about the power supply voltage to about zero. The comparison device 200 may now energize the low frequency generator 115 if the comparison device 200.

The comparison device 200 may also detect a change in current in the sensor transmitter 100. For example, the sensor 110 may vary the sensor current upon sensing or detecting the condition or event. The comparison device 200 may compare a sensor current to a power supply current to determine when to energize the low frequency generator 115.

Figure 3:
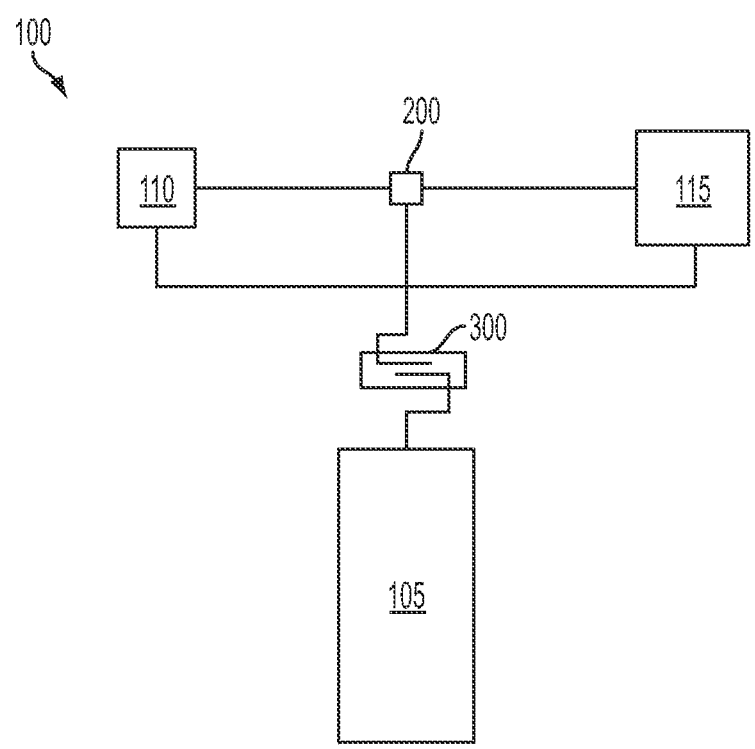
FIG. 3 depicts the sensor transmitter with the comparison device and a magnetic field sensor according to one or more embodiments shown and described herein.

FIG. 3 depicts the sensor transmitter 100 with the comparison device 200 and a magnetic field sensor 300. In one embodiment, the magnetic field sensor 300 may have normally open (NO) contacts. This embodiment of the sensor transmitter 100 may allow for long term applications of sensing for the presence of the condition. The magnetic field sensor 300 may act like a switch, providing power to the comparison device 200, the sensor 110, and the low frequency generator 115 when the magnetic field sensor 300 is placed within a magnetic field. In other words, the magnetic field sensor 300 may be conductive when in the presence of a magnetic field (i.e. the NO contacts are closed) and the magnetic field sensor 300 may be non-conductive in the absence of a magnetic field. The magnetic field sensor 300 with NO contacts may be used to isolate the sensor 110, the comparison device 200, and the low frequency generator 115 from the power supply 105 so that the sensor 110, the comparison device 200, and the low frequency generator 115 are only powered when the magnetic field is present. In another embodiment, the magnetic field sensor 300 may have characteristics opposite of the above example depending on the construction of the magnetic field sensor 300. In other words, the magnetic field sensor 300 may have normally closed (NC) contacts.

The magnetic field may be produced by a magnet, a rare earth magnet, an electromagnet, or by inducing a current into a metal enclosure (metal enclosure 400 in FIG. 4) surrounding the sensor transmitter 100 thereby creating a magnetic field in the metal enclosure. The magnetic field sensor 300 may be a reed switch or a Hall Effect sensor. An example a reed switch may be a contact type reed switch, single pole/single throw model # MKA-10110. FIG. 4 depicts the sensor transmitter 100 within one or more metal enclosures 400. The metal enclosure 400 may be any containment vessel or structure that surrounds the sensor transmitter 100 and is made from metal or metal alloys to include but not limited to copper, aluminum, zinc, steel, brass, chromium, cobalt, gold, iron, lead, magnesium, manganese, nickel, platinum, silver, tin, titanium, and tungsten. The metal enclosure 400 may be a solid structure or a wireframe structure. For example, the metal enclosure 400 may be a shipping container, a storage tank, a pipe, an engine, a bearing housing, a railroad car, a fuel tank to include a rubber bladder housed in an aluminum-walled chamber, an aircraft compartment, a spacecraft compartment, metal structures, metal walls of any transportation vehicle or piece of equipment, and bridges and supporting structure. A sensor communication system 405 may include the sensor transmitter 100 and a receiver 420. The receiver may be used to receive a low frequency wireless signal from the low frequency generator.

The one or more metal enclosures 400 in one embodiment is depicted in FIG. 4 as the nested metal enclosures. Nesting may include 2 or more metal enclosures, each metal enclosure residing within another. For example, a first metal enclosure 401 may be nested or reside complete within a second metal enclosure 402. The second metal enclosure 402 may be nested or reside completely within a third metal enclosure 403. The low frequency wireless signal 102 from the sensor transmitter 100 may need to wirelessly propagate through each wall of each metal enclosure (e.g. 401, 402, 403, etc.).

Figure 5:
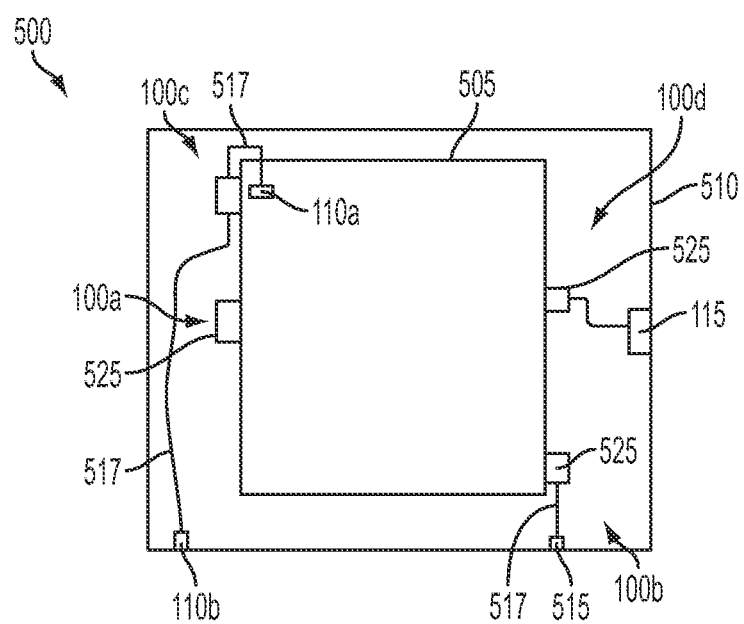
FIG. 5 depicts a double walled liquid product tank with one or more sensor transmitters within according to one or more embodiments shown and described herein.

FIG. 5 depicts in another embodiment the one or more metal enclosures as a double walled liquid product tank 500 that is provided therein with one or more sensor transmitters 100a, 100b, 100c and 100d. The double walled liquid product tank 500 may have an inner metal enclosure 505 surrounded by an outer metal enclosure 510. The components of the one or more sensor transmitters 100a, 100b, 100c and 100d, i.e. the power supply 105, the sensor 110, the low frequency generator, the comparison device 200, and/or the magnetic field sensor 300 are the same as those shown in FIGS. 1-3 for sensor transmitter 100, and such components may be arranged in a number of various configurations within the metal enclosures 400 and/or tank 500. For example, some of those various configurations of the components of the sensor transmitters are shown in FIG. 5.

The components of a first sensor transmitter 100a may reside in a housing 525. The housing 525 may be removably coupled to either the inner metal enclosure 505 or the outer metal enclosure 510. The sensor 110 may be coupled to the housing 525 to sense the condition within the outer metal enclosure 510 or the housing 525 may have an aperture (not shown) to allow the conditions within the outer metal enclosure 510 to be sensed by the sensor 110 within the housing 525.

Some of the components of a second sensor transmitter 100b may reside outside the housing 525. The sensor 110 of FIG. 1 may be a leak detection sensor 515 as shown in FIG. 5. The leak detection sensor 515 may be electrically coupled the sensor transmitter 100 by one or more conductors 517, such as, for example, a cable, or twisted pair, etc. The leak detection sensor 515 may be positioned within the metal enclosure where it is most likely to sense the condition.

A third sensor transmitter 100c may include one or more sensors. For example, and not limited thereto, a first sensor 110a and a second sensor 110b may be electrically coupled to the third sensor transmitter 100c by one or more conductors 517. In other embodiments, it is to be appreciated that any and all of the sensor transmitters 100 (FIG. 4), 100a, 100b, 100c and 100d may include as many sensors 110 as needed to monitor the condition or events within the one or more metal enclosures 400 and/or tank 500. The first sensor 110a may sense a first condition within the inner metal enclosure 505 and the second sensor 110b may sense a second condition within the outer metal enclosure 510. In one embodiment, each sensor (e.g. first sensor 110a and second sensor 110b) may each have their own corresponding low frequency generator (e.g. a first low frequency generator transmitting a first low frequency wireless signal at a first frequency and a second low frequency generator transmitting a second low frequency wireless signal at a second frequency). In another embodiment, each sensor (e.g. first sensor 110a and second sensor 110b) may be electrically coupled to a low frequency generator (e.g. a first low frequency generator transmitting a first low frequency wireless signal at a first frequency and transmitting a second low frequency wireless signal at a second frequency). In this embodiment, the low frequency generator may be able to transmit at more than one frequency more than one low frequency wireless signal.

Still referring to FIG. 5, a fourth sensor transmitter 100d may have the low frequency generator 115 reside outside of the housing 525. The low frequency generator may be coupled to the metal enclosure by a magnet, an adhesive, a tape, a mechanical device such as a hook, VELCRO®, or a fastener such as a screw or nail. The low frequency generator 115 may be position to minimize the attenuation through the outer metal enclosure 510.

The housing 525 may be attached to any portion of the metal enclosure. The attachment may be by a magnet coupled to the housing 525 and magnetically coupled to the metal enclosure. The attachment may also be by an adhesive, a tape, a mechanical device such as a hook, VELCRO®, or a fastener such as a screw or nail. The housing 525 may be made from metal, plastic, glass, or other like materials.

The sensor transmitters 100a, 100b, 100c and 100d may all or any combination thereof reside together within the same or different metal enclosures, such as metal enclosure 400. Alternatively, they may each reside within a different metal enclosure 400 nested within one another, such as for example, and not limited thereto the nested metal enclosures 401, 402, and 403 shown in FIG. 4. Each sensor transmitter 100a, 100b, 100c and 100d may have a different low frequency wireless signal 102 that is transmitted by the low frequency generator 115. The different frequencies allow for the receiver 420, shown in FIG. 4, to differentiate between sensor transmitters to determine which sensor 110 is detecting or sensing the condition or event.

Referring to FIGS. 1-4, the sensor transmitter 100 may signally communicate to the receiver 420 that the sensor 110 senses a condition within the metal enclosure 400. When the sensor 110 senses the presence of a condition or event within the metal enclosure 400, the sensor 110 changes its electrical characteristics. The change in the electrical characteristic may either energize or de-energize the low frequency generator 115. When the low frequency generator 115 is energized, it produces the low frequency wireless signal. A receiver 420 that is external to the metal enclosure 400 is calibrated to receive wirelessly the low frequency wireless signal and thereby indicate the presence of the condition within the metal enclosure 400.

In one embodiment, the low frequency wireless signal 102, and specifically the detection of the low frequency magnetic component of the low frequency wireless signal, may be detected outside of a metal enclosure such as copper or aluminum or a carbon composite enclosure containing copper braid, brass, bronze, any nonmagnetic metal. The amount of attenuation of the low frequency wireless signal during propagation through the metal enclosure may be dependent on the wavelength of the low frequency wireless signal and the thickness and properties of the metal of the metal enclosure.

The low frequency wireless signal 102 may be less than about 100 kHz. The frequency used for the low frequency wireless signal 102 may be chosen based on the type of material the metal enclosure 400 is made from and the thickness of the metal enclosure 400. For example, if the metal enclosure 400 was made from about 7.5 mm (300 mil) thickness of copper, the low frequency wireless signal should be below about 1000 Hz. If the metal enclosure 400 was made from aluminum of about 2.5 mm thickness (100 mil) frequencies below 10,000 HZ can be detected from outside the enclosure. To achieve better penetration, a lower frequency may be selected. In one embodiment, a 60 Hz low frequency signal may be used which may correspond to the frequency of the power supply 105. The 60 Hz low frequency signal may be advantageous for metals such as aluminum for example. In another embodiment, the low frequency signal 102 may be about 10 Hz. In yet another embodiment, a DC low frequency signal may be used for an aluminum enclosure. It should be noted that 20 Hz to about 20 kHz defines the audible range for human hearing however the magnetic/electrical properties of the low frequency signal differ from the sounds waves of audible hearing. Therefore, the low frequency signal may be within the frequency range of audible hearing but not heard by a user.

The low frequency wireless signal 102 in other embodiments may be a sound wave. The sound wave may propagate through the metal enclosure 400 much easier than higher frequency electromagnetic waves. In sound wave based embodiments, the low frequency generator 115 may be in direct contact with the metal enclosure 400 to transmit the low frequency wireless signal 102 using the metal enclosure 400 as a medium for propagation of the sound wave. Sound waves travel from about 10 to about 15 times faster through a metal medium than through an atmospheric medium. Sound waves may be used when the properties of the metal enclosure 400 attenuate an electromagnetic wave to the point that it may not be received external to the metal enclosure 400. For example, steel may severely attenuate an electromagnetic frequency signal. Conversely, a sound low frequency signal may propagate through steel with minimal attenuation. Furthermore, a user may simply "hear" the sound wave as the low frequency signal and may not require the use of the receiver 420 to determine if the condition is detected or not.

Still referring to FIGS. 1-4, for embodiments with short term applications, the sensor transmitter 100 may be powered using a battery or a continuous electrical power supply such as an A/C circuit connected to the power grid. For situations where the sensor transmitter 100 is not required to transmit the low frequency wireless signal between long durations of time or where the sensor transmitter 100 is isolated from a continuous electrical power supply, the magnetic field sensor 300 may be used to isolate the components of the sensor transmitter 100 from the power supply 105 and conserve energy. In one embodiment, the magnetic field sensor 300 may be used. In another embodiment, the induction antenna may be used. The excitation field may need to be a low frequency (below about 100 kHz) to penetrate the metal enclosure 400 and excite the induction antenna. For both the magnetic field sensor 300 and the induction antenna, the sensor transmitter 100 is powered only when the magnetic field sensor 300 is in a magnetic field or when the induction antenna is within the excitation field. Therefore, the sensor 110 may detect the condition or event and undergo a physical change that changes its electrical characteristics as described above and the low frequency generator 115 may not transmit the low frequency wireless signal until either a magnetic field is placed near the magnetic field sensor 300 or an excitation field is transmitted to the induction antenna. A marker may be placed on the outside surface of the metal enclosure 400 to indicate where the magnet (not shown) to produce the magnetic field, or the excitation antenna (not shown) to produce the excitation field, should be placed to activate or power the sensor transmitter 100.

Referring to FIG. 2, in one experimental embodiment, a 3900 Hz buzzer was chosen as the low frequency generator 115 that generated a low frequency wireless signal 102 at a peak of about 3700 Hz. The receiver of the signal 102 was a microphone 116 electrically coupled to a spectrum analyzer (not shown). The sensor transmitter 100 comprising the sensor 110, a FET for the comparison device 200, a 9 volt battery for the power supply 105, and the 3900 Hz buzzer 115 was placed within a metal box 118, which in this embodiment was a steel cabinet having 1 mm thick steel walls. For the experiment, the sensor contacts were left electrically open so the 3900 Hz buzzer was continuously running. At varying distances from the steel cabinet, the 3700 Hz peak was detected by the microphone 116 and shown in the spectral analyzer. At short distances, from about 2.54 centimeters (cm) (about 1 inch) from the steel cabinet to about 1.22 meters (about 4 feet) from the metal box 118, the 3700 Hz peak was detected and a plurality of sideband frequencies spaced 3700 Hz apart was detected up to 20 kHz, 20 kHz was the upper frequency limit monitored by the spectrum analyzer. In other words, the sideband frequency of 3700 Hz means a peak in the frequency was shown every 3700 Hz interval up to 20 kHz. Notable, intense, peaks (sidebands) were recorded at about 3700 Hz, 7400 Hz, 11,100 Hz, 14,800 Hz, and about 18,500 Hz. At about 3 meters (about 10 feet) away, only the 3700 Hz peak was detected by the microphone. The audible buzzing of the 3,900 Hz buzzer was heard by the microphone 116 up to about 6.1 meters (about 20 feet) away. The sound produced by the buzzer was also audible up to about 6.1 meters (about 20 feet) away.

In another experimental embodiment, the metal box 118 was a small aluminum box with about 1 mm wall thickness. The sensor transmitter 100, comprising the sensor 110, the FET 200, a 9 volt battery 105, a reed switch 300 (connected as shown in FIG. 3), and the 3900 Hz buzzer 115, was placed within the small aluminum box. The sensor 110 contacts were left electrically open (open circuit state) so the 3900 Hz buzzer was continuously running. The metal box 118 was then nested within two slightly larger aluminum boxes like the metal enclosures 401, 402 and 402 shown in FIG. 4. The three nested aluminum boxes had a combined aluminum wall thickness of about 3 mm with air pockets in between the individual aluminum walls. A hand held non-rare earth magnet was placed on the nested aluminum boxes to close the contacts on the reed switch 300. Whereas the non-rare earth magnet was placed on the aluminum box to close the reed switch, a rare-earth magnet was shown to close the reed switch contacts up to about a 30.5 cm (about 1 foot) away. At varying distances from the nested aluminum boxes, the 3700 Hz peak was detected by the microphone 116 and shown in the spectral analyzer. At short distances, about 2.54 cm (about 1 inch) to 1.22 meters (about 4 feet) from the nested aluminum boxes, the 3700 Hz peak was detected and a plurality of sideband frequencies spaced 3700 Hz apart was detected up to the 20 kHz, 20 kHz was the upper frequency limit monitored by the spectrum analyzer. Notable, intense, peaks (sidebands) were recorded at about 3700 Hz, 7400 Hz, 11100 Hz, 14800 Hz, and about 18500 Hz. At about 3 meters (about 10 feet) away, only the 3700 Hz peak was detected by the microphone 116. The audible buzzing of the 3900 Hz buzzer was heard up to about 6.1 meters (about 20 feet) away.

In still another experimental embodiment, a micromotor was used as the low frequency generator 115. The micromotor was a 9 VDC, 115 milli-Amp (mA) micromotor that was capable of rotating at about 2400 revolutions per minute (RPM) at 400 Hz. The low frequency wireless signal from the micromotor was about 350 Hz. The sensor transmitter 100 was tested with the sensor 110 in an open-circuit state (to activate the comparison device without the need to sense for a condition or event), a FET for the comparison device 200, and a 9 VDC battery for the power supply 105. The sensor transmitter 100 was placed within a steel cabinet and the micromotor was placed against the steel wall. In this embodiment, the motor was audible from about 91.4 cm (about 3 feet) away. Using the microphone 116 and spectral analyzer as the receiver, the intensity of the peaks was comparable to those of the 3900 Hz buzzer but the frequency of the peaks occurred at every 350 Hz up to about 5 kHz.

In still another experimental embodiment, a sensor transmitter 100 comprising the micromotor as the low frequency generator 115 was placed within the nested aluminum boxes, such as depicted by metal enclosures 401, 402 and 402 in FIG. 4. As in the previous experimental embodiment, the sensor transmitter 100 comprises the sensor 110 in an open-circuit state (to activate the comparison device without the need to sense for a condition or event), the FET for the comparison device 200, the 9 VDC battery 105, the reed switch 300, and the micromotor. A hand held non-rare earth magnet was placed on the nested aluminum boxes to close the contacts on the reed switch and alternatively a rare-earth magnet was used to close the contacts on the reed switch from about 30.5 cm (about 1 foot) away. With the reed switch closed, the micromotor was audible at from about 91.4 cm (about 3 feet) away. At varying distances from the nested aluminum boxes, the 350 Hz peak was detected by the microphone and shown in the spectral analyzer. At short distances, about 30.5 cm (about 1 foot) from the nested aluminum boxes, the 350 Hz peak was detected and a plurality of sideband frequencies spaced 350 Hz apart was detected up to the 5 kHz.

In the above experimental embodiment, the peaks, in relation to the 3900 Hz buzzer and micromotor, were not as intense as if the sensor transmitter 100 was placed outside of the metal enclosure 400. The metal enclosure 400 attenuated the electrical fields of the low frequency wireless signal 102. Where the low frequency generator 115 could not be placed against the wall of the metal enclosure 400, a spectrum analyzer designed to detect the magnetic fields of the low frequency generator 115 could be used. The waveforms of the magnetic fields were similar to the electrical fields. For instance, the 3900 Hz buzzer produces a periodic waveform of 3700 Hz. For the micromotor, a periodic waveform of 350 Hz was detected.

An example of a spectrometer that can detect magnetic fields is the Spectran NF-3020 hand-held spectrum analyzer operating in the magnetic field mode. The Spectran was operated using an open air coil inductor as a secondary antenna. In the above experimental embodiments, the magnetic waves could not be detected through the steel cabinet due to the ferrous content of the steel, however the magnetic waves from the buzzer and/or micromotor were detected from the nested aluminum boxes. Using the Spectran NF-3020, the magnetic spectrum was similar to the electrical spectrum as described above for the 3900 Hz buzzer. The strength of the magnetic field from the 3900 Hz buzzer was measured before each aluminum box was successively nested. The strength of the magnetic field was:

Open surface: 1.1 milli-volt (mV)
Inside box 1: 0.2 mV (40 mil of total thickness of aluminum)
Inside box 2: 0.02 mV (80 mil of total thickness of aluminum)
Inside box 3: 0.008 mV (120 mil of total thickness of aluminum)
Background measurement: 0.001 mV In another experimental embodiment, the micromotor was also placed within the nested aluminum boxes and the magnetic field was measured. The magnetic spectrum contained one main peak at 2200 Hz. The Spectran was set to read magnetic fields from about 1000 Hz to about 10 kHz to reduce background interference. Referring to the micromotor, the strength of the magnetic field in each aluminum nested box was:

Open surface: 520 nano-Tesla (nT)
Inside box 1: 360 nT (40 mil of total thickness of aluminum)
Inside box 2: 150 nT (80 mil of total thickness of aluminum)
Inside box 3: 77 nT (120 mil of total thickness of aluminum)
Background measurement: 0.6 nT Referring to FIGS. 1-5, the low frequency generator 115 is chosen to transmit the low frequency wireless signal 102 through the metal enclosure 400 with minimal amount of attenuation of the electrical field and interference with the magnetic field. The receiver 420 is chosen to match the low frequency wireless signal and account for any attenuation and interference. Interference may come from the background or from the metal enclosure 400 or tank 500. The receiver 420 may be a dedicated circuit designed to receive the low frequency wireless signal, a commercial hand-held device, or a spectrum analyzer. The receiver 420 may be configured to measure the periodic waveform, thus, the low frequency wireless signal may be received even though the receiver 420 is not configured to read the most notable, intense, peak frequency. For example, referring to the Spectran set-up above in relation to the micromotor, it is known that the carrier wave (the low frequency wireless signal) was about 350 Hz. The Spectran received about 2200 Hz which is a sideband of the 350 carrier wave. This is an example of how the most intense peak frequency (350 Hz) is not needed to indicate outside the metal enclosure 400 or tank 500 that the sensor 110 has sense or detected a condition or event.

A sensor communication system 405 may be used to detect the presence of more than one condition within a metal enclosure 400 or tank 500. In one embodiment, one or more sensor transmitters are used for each condition or event to be monitored, such as, and not limited thereto, sensor transmitters 100a, 100b, 100c and 100d shown in FIG. 5. The low frequency wireless signal 102 from each sensor transmitter 100a-110d may be unique to each condition or event. Therefore, for example, if two specific conditions (leak and gas) and an event (impact) are desired to be monitored, a first sensor transmitter 100a electrically coupled to a leak detection sensor, a second sensor transmitter 100b electrically coupled to an impact sensor, and a third sensor transmitter 100c electrically coupled to a gas sensor are positioned within the metal enclosure 400 or tank 500. The first transmitter may include a first power supply, a first comparison device, a first sensor (e.g. leak detection sensor) and/or a first magnetic field device. The second transmitter may include a second power supply, a second comparison device, a second sensor (e.g. impact sensor) and/or a second magnetic field device. The third transmitter may include a third power supply, a third comparison device, a third sensor (e.g. gas sensor) and/or a third magnetic field device. Each sensor transmitter may have a specific low frequency wireless signal 102 to indicate which of the sensor transmitters 100 within the metal enclosure 400 or tank 500 are indicating the detection of the condition or event. For example, the first sensor transmitter may have a first low frequency wireless signal of about 10 kHz, the second sensor transmitter may have a second low frequency wireless signal of about 150 Hz, and a third sensor transmitter may have a third low frequency wireless signal of about 15 kHz. The receiver 420 may be tuned to each low frequency wireless signal. If the 10 kHz low frequency wireless signal is detected, it is indicative of the leak detection sensor detecting a leak condition within the metal enclosure 400 or tank 500.

Figure 6:
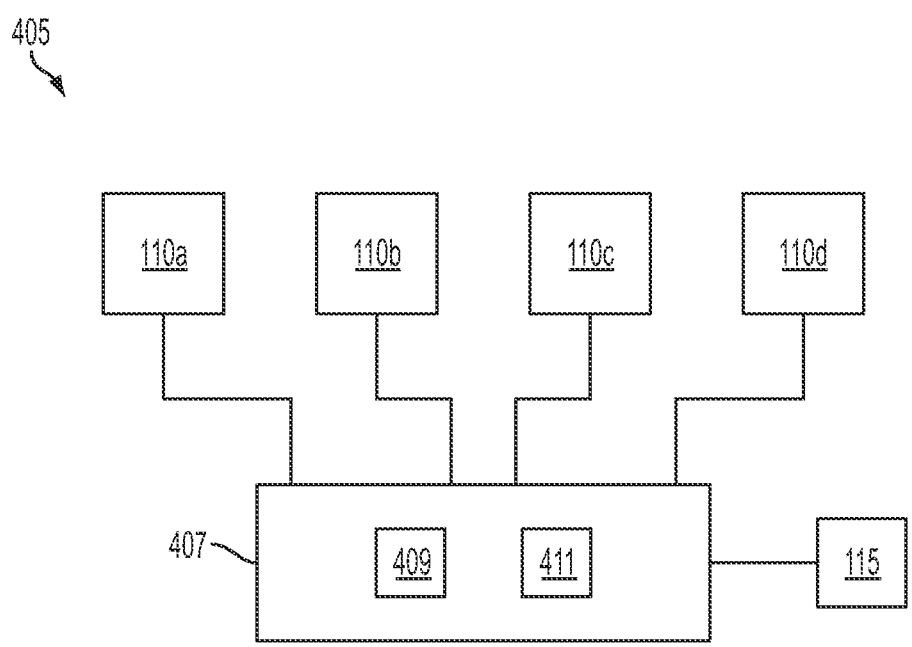
FIG. 6 depicts a sensor communication system according to one or more embodiments shown and described herein.

In another embodiment as depicted by FIG. 6, the sensor communication system 405 may include a controller 407 that is in communication with the receiver 420. The controller 407 may include a processor 409 and a computer readable medium or memory 411. The processor 409 may execute a set of instructions recorded on the computer-readable medium or memory 411 to determine which sensor of a plurality of sensors 110a-110d has detected or sensed the presence of the condition or event and which associated low frequency wireless signal 102 to transmit via the low frequency generator 115. In this embodiment, the plurality of sensors 110a-110d are electrically coupled to the controller 407 within the sensor transmitter 100 and each sensor has a unique identification (ID) or is electrically coupled to a specific input/output (I/O) port on the controller 407. When individual sensors 110 of the plurality of sensors detect the presence of the condition or event, the controller 407 detects the change in the electrical characteristic of the sensor 110. The controller 407 may then, executing the instructions on the computer readable medium or memory 411, determine the low frequency wireless signal which indicates the condition sensed by the associated sensor 110. The low frequency generator 115 is electrically coupled to the controller 407. The low frequency generator 115 may be a micromotor that varies its RPM based on the voltage or current supplied by the controller to vary the low frequency signal to correspond with the detected condition. The controller 407 may activate the low frequency generator 115 to transmit the required low frequency wireless signal 102 (e.g. the correct RPM corresponding to the low frequency signal for the detected condition). Alternatively, one or more low frequency generators 115 are electrically coupled to the controller 407 and each may have a unique ID or alternatively, each is electrically coupled to a specific I/O port of the controller. The specific low frequency generator 115 that corresponds to the required low frequency wireless signal 102 is activated by the controller 407. In another embodiment, the controller 407 may be used to prioritize which of a number of low frequency signals is to be transmitted. For example, if a corrosive gas is detected along with a liquid leak, the controller 407 may prioritize transmitting the corrosive gas low frequency signal over the liquid leak low frequency signal to alert a user that protective gear is required. The controller 407 may transmit the corrosive gas low frequency signal twice for every single liquid leak low frequency signal transmission. Alternatively, an indexing low frequency signal may be used to indicate that the next low frequency signal is the priority low frequency signal. The indexing low frequency signal may also be used to indicate that more than one sensor 110 (e.g. two or more sensor 110) has detected their specific condition. The indexing low frequency signal may have a frequency that is separate and distinct from the low frequencies associated with the one or more sensors 110.

One or more sensor transmitters 100 may be used to signally communicate the presence of a condition or the occurrence of an event within one or more metal enclosures 400 or tank 500 without the need for the metal enclosure or tank to be opened and inspected. Each sensor transmitter 100 may have one or more sensors electrically coupled to it to detect only one condition or event or multiple conditions or events. Each sensor transmitter 100 generally only has one low frequency generator 115 that transmits a low frequency wireless signal 102. The transmission of the low frequency wireless signal 102 may be used to penetrate a metal enclosure 400 or tank 500 to indicate the sensed condition or event by the one or more sensors. The choice of which frequency to transmit the low frequency signal 102 at is made by evaluation of the material the low frequency signal 102 needs to propagate through. In other words, the frequency of the low frequency generator 115 is chosen to provide the best indication of the condition outside of the one or more metal enclosures 400. The low frequency generator 115 may be positioned on or near the metal enclosure or tank wall or it may be placed within the metal enclosure or tank. The sensor transmitters 100 and/or sensor communication system 405, with or without receiver 420, accordingly enables ground crew and/or by maintenance personnel when inspecting an aircraft, a pipeline, a tank, etc. to locate and identify the occurrence of a particular conditions or events with a metal enclosure without the need to open and inspect the inside of the metal enclosure.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A sensor transmitter for communicating wirelessly a presence of a condition within a metal enclosure, comprising:
   a power supply;
   at least one sensor, individual ones of the at least one sensor senses a presence of a condition;
   a low frequency generator positioned within a metal enclosure and electrically coupled to the power supply and the at least one sensor, the low frequency generator transmits a low frequency wireless signal of less than about 100 kHz indicative of the presence of the condition within the metal enclosure when the condition is present at the individual ones of the at least one sensor;
   a comparison device electrically coupled between the at least one sensor and the low frequency generator; and
   a magnetic field sensor electrically coupled between the power supply and the comparison device such that the sensor transmitter is not able to transmit the low frequency wireless signal indicative of the presence of the condition within the metal enclosure until the magnetic field sensor is placed within a magnetic field.

2. The sensor transmitter of claim 1, further comprising:
   a second sensor that senses the presence of a second condition electrically coupled to the power supply; and
   wherein the low frequency generator transmits a second low frequency wireless signal of less than about 100 kHz indicative of the presence of the second condition within the metal enclosure when the second condition is present at the second sensor.

3. The sensor transmitter of claim 1, wherein the comparison device is a field effect transistor.

4. The sensor transmitter of claim 1, wherein the magnetic field sensor is a hall effect sensor.

5. The sensor transmitter of claim 1, wherein the magnetic field sensor is a reed switch.

6. The sensor transmitter of claim 1, wherein the power supply is an induction antenna and receives electromagnetic radiation of a specific wavelength to provide power for the sensor transmitter.

7. The sensor transmitter of claim 1, wherein the low frequency generator is an acoustic device, resonance coil, micromotor, or an off-center weighted motor.

8. The sensor transmitter of claim 1, wherein the condition is a leak, an impact, a humidity, a fuel, vapor, a temperature, a levelness, a flex, a vibration, a sound, a clamp opening, a crack, corrosion, or a light.

9. The sensor transmitter of claim 1, wherein the low frequency wireless signal is between about 20 Hz to about 20 kHz.

10. The sensor transmitter of claim 1, wherein the at least one sensor is chosen from the group consisting of a leak detection sensor, a vapor sensor, a water sensor, an impact sensor, a temperature sensor, a level sensor, distillate sensor, a variable resistor such as a flex sensor, a vibration sensor, an acoustic sensor, pressure switch, conductive line, corrodible metal film, and a light sensor.

11. A method for communicating a presence of a condition within a metal enclosure, comprising:
   using a sensor transmitter for communicating wirelessly the presence of the condition within the metal enclosure, the sensor comprises:
   a power supply,
   at least one sensor, individual ones of the at least one sensor senses a presence of a condition,
   a low frequency generator positioned within the metal enclosure and electrically coupled to the power supply and the at least one sensor, the low frequency generator transmits a low frequency wireless signal of less than about 100 kHz indicative of the presence of the condition within the metal enclosure when the condition is present at the individual ones of the at least one sensor,
   a comparison device electrically coupled between the at least one sensor and the low frequency generator, and
   a magnetic field sensor electrically coupled between the power supply and the comparison device such that the sensor transmitter is not able to transmit the low frequency wireless signal indicative of the presence of the condition within the metal enclosure until the magnetic field sensor is placed within a magnetic field, sensing a condition internal to a metal enclosure using at least one sensor;

sensing a magnetic field using a magnetic field sensor; and transmitting the low frequency wireless signal of less than about 100 kHz using the low frequency generator due to the condition being present at the at least one sensor and the magnetic field sensor being placed within a magnetic field.

12. The method of claim 11, further comprising receiving the low frequency wireless signal external to the metal enclosure.

13. The method of claim 11, wherein the at least one sensor comprises a first sensor and a second sensor, the method further comprising:

sensing a first condition internal to the metal enclosure using the first sensor;

transmitting the low frequency wireless signal of less than about 100 kHz when the first sensor senses the first condition;

sensing a second condition internal to the metal enclosure using the second sensor; and transmitting a second low frequency wireless signal of less than about 100 kHz when the second sensor senses the second condition wherein the frequency of the low frequency wireless signal is different from the second low frequency wireless signal.

14. A system for communicating with a sensor within a metal enclosure comprising:

a first power supply;

one or more sensor transmitters internal to a metal enclosure, a first sensor transmitter comprising:

a first sensor to detect a presence of a first condition, a first low frequency generator positioned within the metal enclosure and electrically coupled to the first power supply and the first sensor, and which transmits a first low frequency wireless signal of less than about 100 kHz when the first condition is present at the first sensor which is indicative of the presence of the condition within the metal enclosure, a first comparison device electrically coupled between the first sensor and the first low frequency generator, and a magnetic field sensor electrically coupled between the first power supply and the first comparison device such that the one or more sensor transmitters are not able to transmit the low frequency wireless signal indicative of the presence of the condition within the metal enclosure until the magnetic field sensor is placed within a magnetic field; and a receiver external to the metal enclosure that receives the first low frequency wireless signal indicative of the detection of the presence of the first condition.

15. The system of claim 14, wherein the first power supply is an induction antenna and receives electromagnetic radiation of a specific wavelength to provide power for the one or more sensor transmitters.

16. The system of claim 14, further comprising:

a second power supply;

a second sensor transmitters internal to the metal enclosure, comprising:

a second sensor to senses a presence of a second condition, a second low frequency generator electrically coupled to the second power supply and the second sensor and transmits a second low frequency wireless signal of less than about 100 kHz when the second condition is present at the second sensor, a second comparison device electrically coupled between the second sensor and the second low frequency generator; and wherein the receiver external to the metal enclosure that receives the second low frequency wireless signal indicative of the detection of the presence of the second condition.

* * * * *

UNITED STATES PATENT AND TRADEMARK OFFICE
CERTIFICATE OF CORRECTION

PATENT NO.        : 9,451,339 B2
APPLICATION NO.   : 14/162845
DATED             : September 20, 2016
INVENTOR(S)       : Robert E. Kauffman et al.

It is certified that error appears in the above-identified patent and that said Letters Patent is hereby corrected as shown below:

In the Claims

Column 18, Claim 16, Line 24:
"a second sensor transmitters internal to the metal enclo-" should read
--a second sensor transmitter internal to the metal enclo- --; and Column 16, Claim 16, Line 28:
"a second sensor to senses a presence of a second" should read
--a second sensor to sense a presence of a second--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*